(12) United States Patent
Krebs

(10) Patent No.: US 7,413,388 B2
(45) Date of Patent: Aug. 19, 2008

(54) METHOD AND APPARATUS FOR PNEUMATICALLY CONVEYING BULK MATERIAL WHICH DOES NOT FLOW READILY

(75) Inventor: Claus Krebs, Krefeld (DE)

(73) Assignee: LANXESS Deutschland GmbH, Leverkusen, DE (US)

( * ) Notice: Subject to any disclaimer, the term of this patent is extended or adjusted under 35 U.S.C. 154(b) by 0 days.

(21) Appl. No.: 11/330,841

(22) Filed: Jan. 12, 2006

(65) Prior Publication Data

US 2006/0165495 A1 Jul. 27, 2006

(30) Foreign Application Priority Data

Jan. 26, 2005 (DE) ............... 10 2005 003 620

(51) Int. Cl.
*B65G 53/08* (2006.01)

(52) U.S. Cl. ............... 406/55; 406/56; 406/60; 406/61; 406/95; 406/120; 406/127; 406/135; 406/144

(58) Field of Classification Search ............ 406/55–56, 406/61, 93, 94, 95, 135, 144, 60, 120, 127
See application file for complete search history.

(56) References Cited

U.S. PATENT DOCUMENTS

| | | | | |
|---|---|---|---|---|
| 2,448,745 A | | 9/1948 | Struckmann ............... 302/50 |
| 2,831,587 A | | 4/1958 | Rearick ............... 214/17 |
| 3,712,681 A | * | 1/1973 | Marino et al. ............... 406/48 |
| 3,722,755 A | * | 3/1973 | Nakashima ............... 141/67 |
| 4,064,829 A | * | 12/1977 | Hervert ............... 118/716 |
| 4,363,571 A | * | 12/1982 | Jackson et al. ............... 406/56 |
| 4,488,838 A | * | 12/1984 | Herud ............... 406/56 |
| 4,502,820 A | * | 3/1985 | Fujii et al. ............... 406/56 |
| 4,711,607 A | * | 12/1987 | Wynosky et al. ............... 406/30 |
| 4,801,210 A | * | 1/1989 | Gian ............... 366/156.2 |
| 4,851,110 A | * | 7/1989 | Rolle et al. ............... 209/135 |
| 5,478,172 A | * | 12/1995 | Oura et al. ............... 406/23 |
| 5,503,198 A | * | 4/1996 | Becker ............... 141/67 |
| 5,558,473 A | * | 9/1996 | Lindahl ............... 406/61 |
| 5,618,136 A | * | 4/1997 | Smoot ............... 406/93 |
| 5,634,713 A | * | 6/1997 | Abe ............... 366/102 |
| 5,660,506 A | * | 8/1997 | Berge et al. ............... 406/3 |
| 5,669,740 A | * | 9/1997 | Townsend et al. ............... 406/38 |
| 5,713,494 A | * | 2/1998 | Kaiju et al. ............... 222/199 |

(Continued)

FOREIGN PATENT DOCUMENTS

BE 559070 4/1960

(Continued)

*Primary Examiner*—Joe Dillon, Jr.
(74) *Attorney, Agent, or Firm*—Nicanor A. Kohncke

(57) ABSTRACT

The invention relates to a method and an apparatus for pneumatically conveying bulk material which does not flow readily, in which:
  bulk material is metered by means of one or more input device(s) (8) into a lateral conveyor (1); and
  the bulk material in the lateral conveyor is subsequently emptied via a transport line (19)
wherein the metering of the bulk material into the lateral conveyor (1) is achieved by means of the input device(s) (8) and the emptying of the lateral conveyor (1) is effected with simultaneous action of a mechanical conveyor (9) in the lateral conveyor and inflowing compressed gas (17), with the mechanical conveyor (9) having a narrow clearance with respect to the lateral conveyor (1), so that the lateral conveyor is substantially emptied during the emptying process.

11 Claims, 14 Drawing Sheets

U.S. PATENT DOCUMENTS

Figure 1:
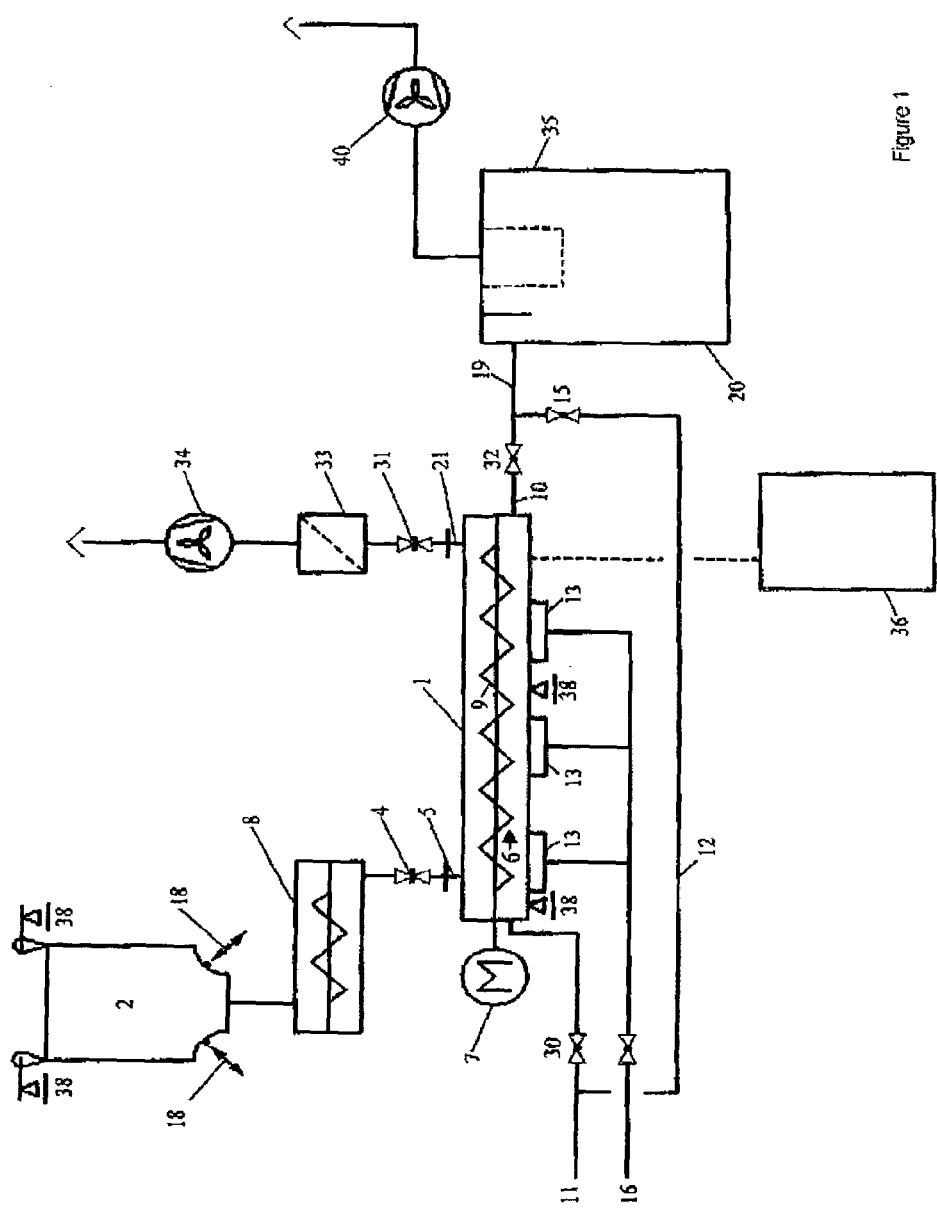

| | | | | |
|---|---|---|---|---|
| 5,836,722 A | * | 11/1998 | Lacchia | 406/122 |
| 5,863,155 A | * | 1/1999 | Segota | 406/61 |
| 6,010,280 A | * | 1/2000 | Svensson | 406/56 |
| 6,609,871 B2 | * | 8/2003 | Pfeiffer et al. | 414/328 |
| 6,719,500 B2 | * | 4/2004 | Pfeiffer et al. | 406/91 |
| 6,764,253 B1 | * | 7/2004 | Pfeiffer | 406/11 |
| 7,080,960 B2 | * | 7/2006 | Burnett | 406/11 |
| 7,137,759 B1 | * | 11/2006 | Ambs | 406/55 |
| 7,144,204 B2 | * | 12/2006 | Hilgraf | 406/95 |

FOREIGN PATENT DOCUMENTS

| | | |
|---|---|---|
| DE | 267 850 | 5/1989 |
| DE | 40 14 912 | 11/1991 |
| DE | 201 00 783 | 5/2001 |
| DE | 199 60 221 | 9/2002 |
| EP | 692 441 | 9/1998 |
| EP | 1 327 867 | 7/2003 |

* cited by examiner

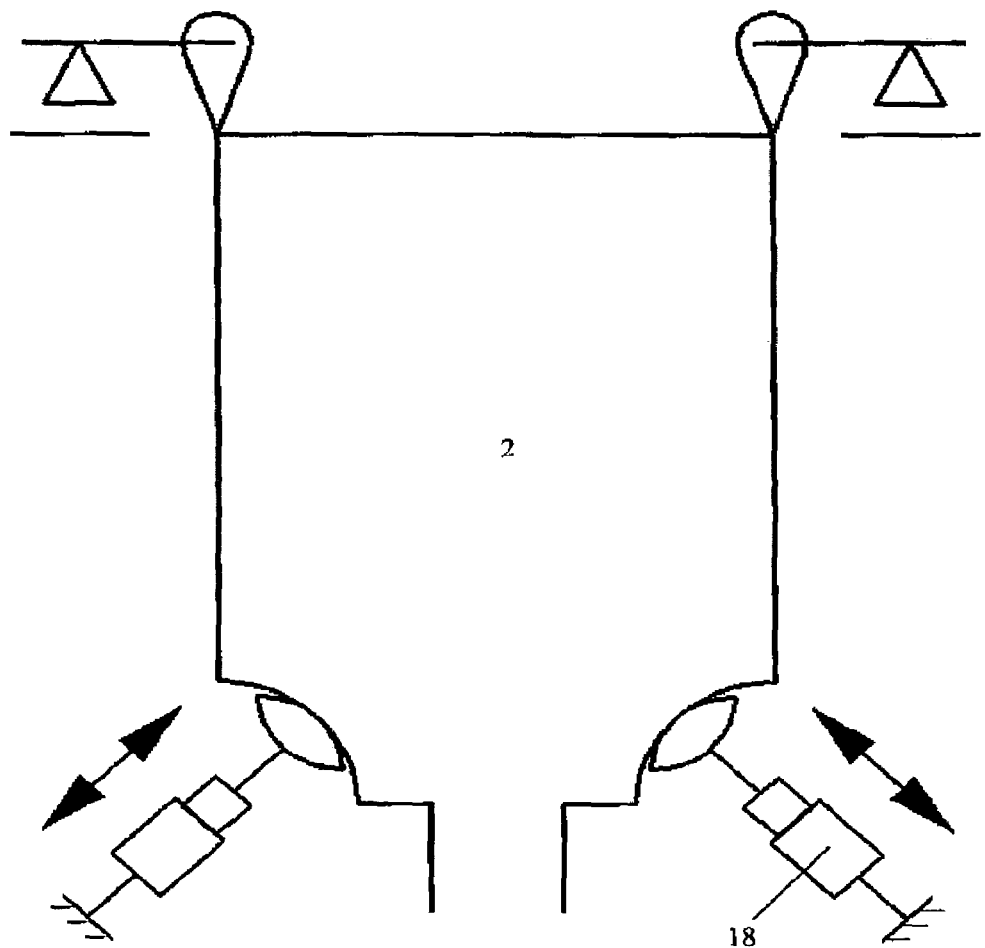
Figure 6 – PRIOR ART

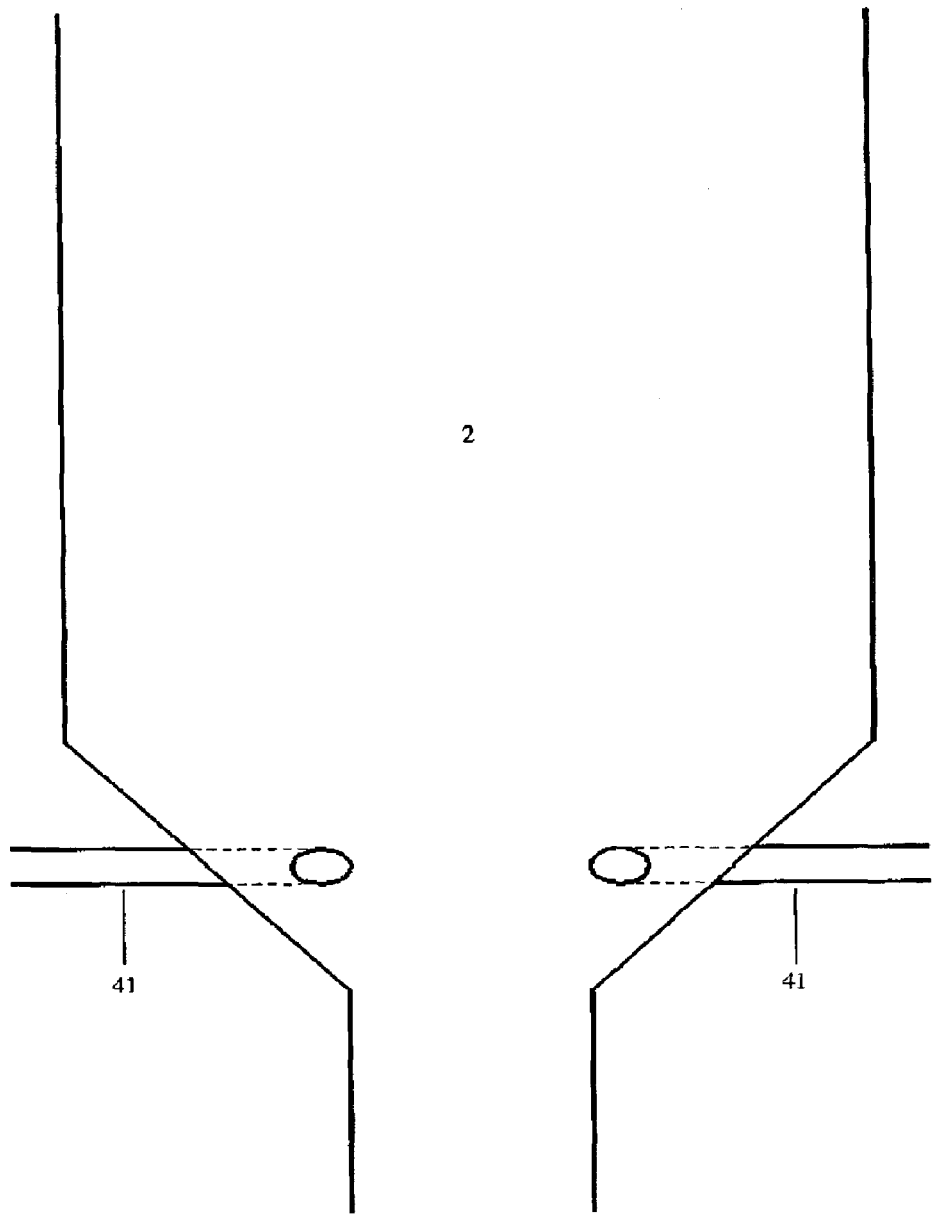
Figure 7 - PRIOR ART

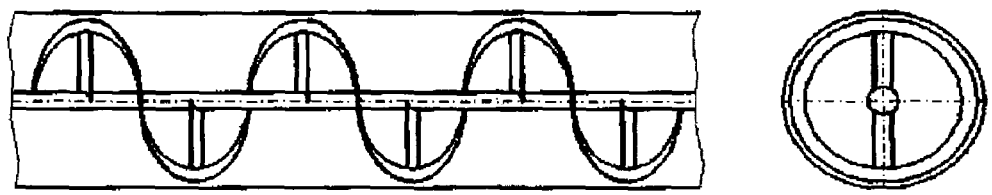
Figure 8 - PRIOR ART
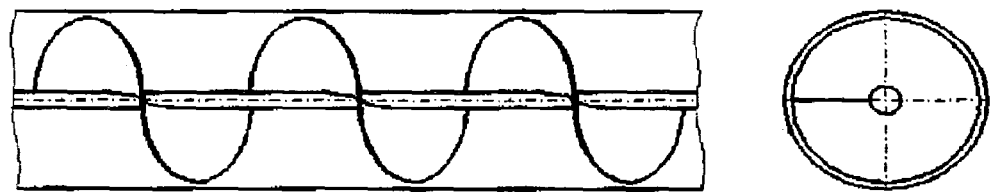
Figure 9 - PRIOR ART
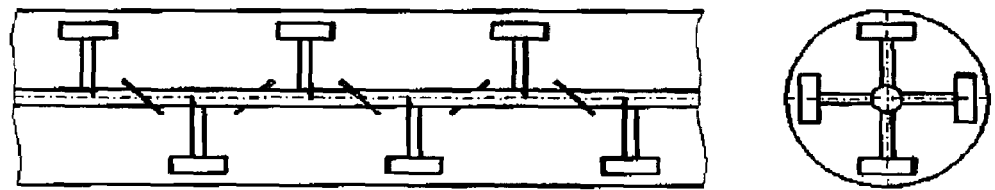
Figure 10 - PRIOR ART

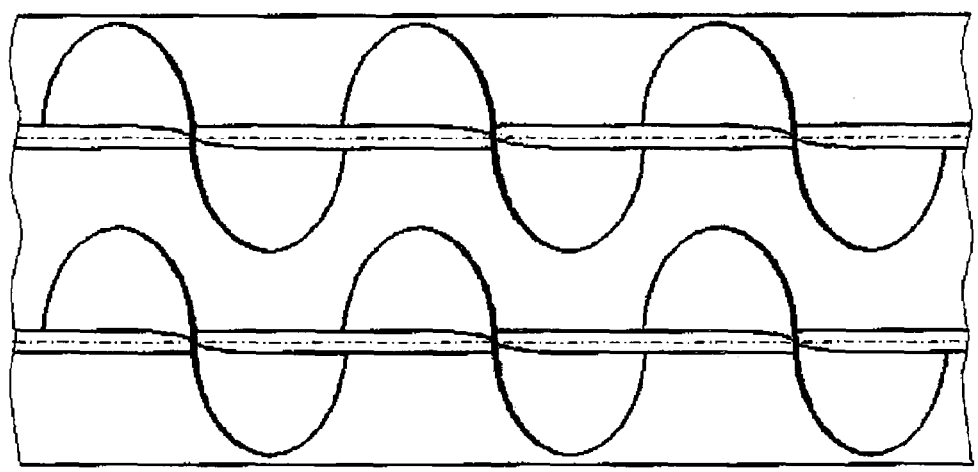
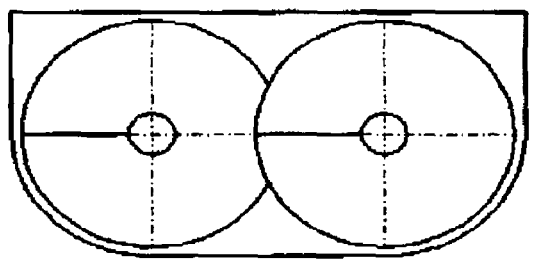
Figure 11- PRIOR ART

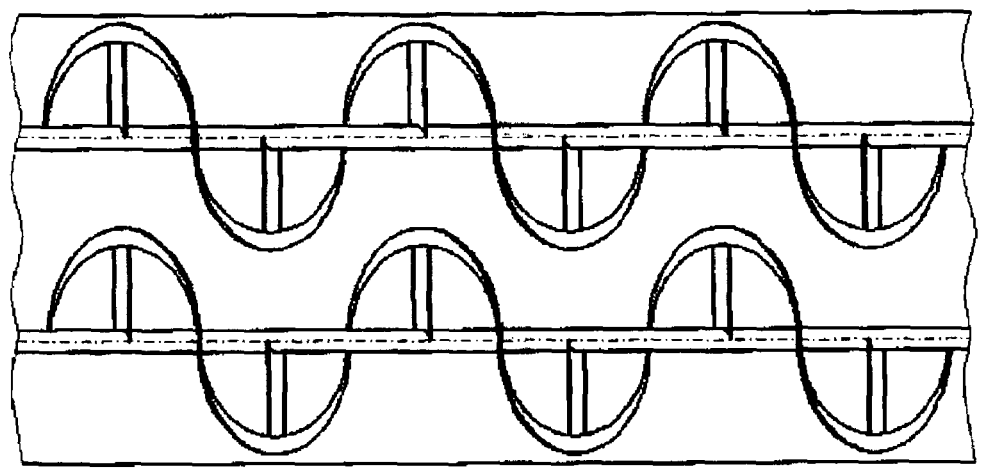
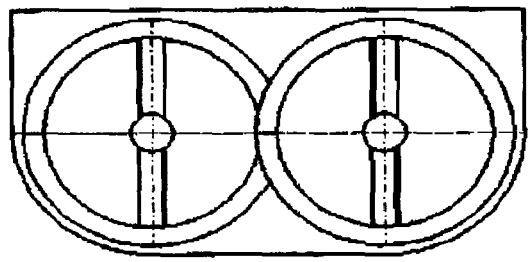
Figure 12 - PRIOR ART

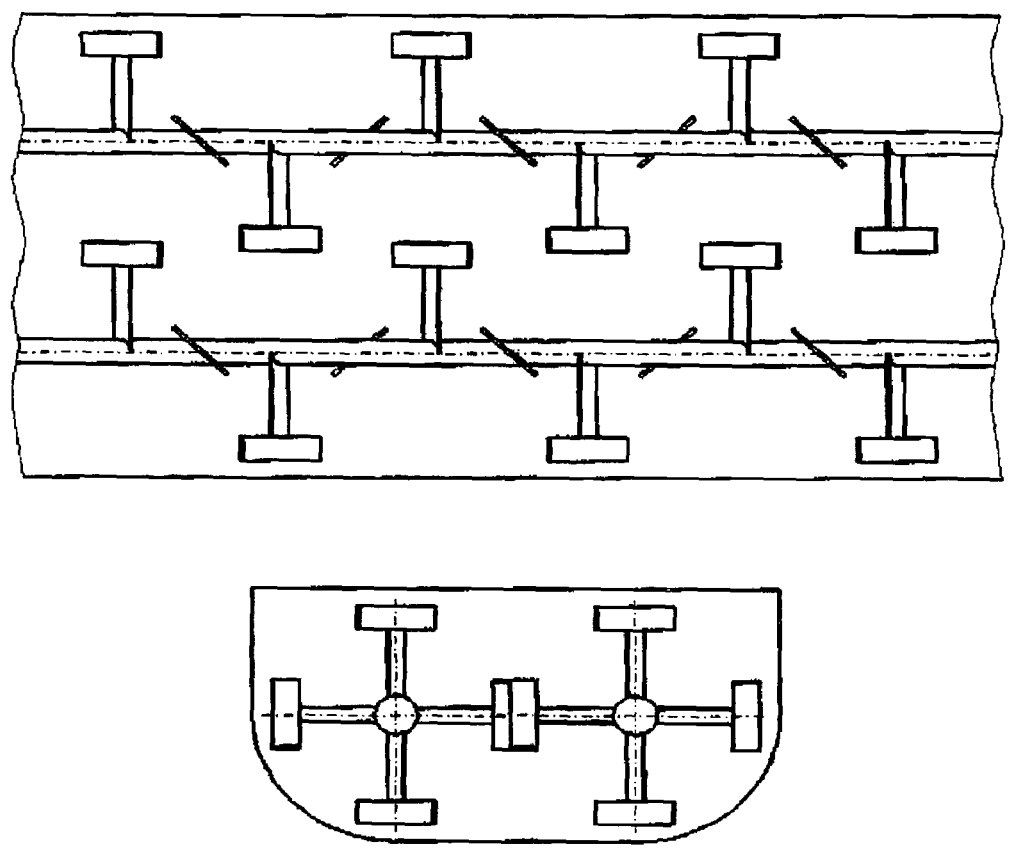
Figure 13 - PRIOR ART

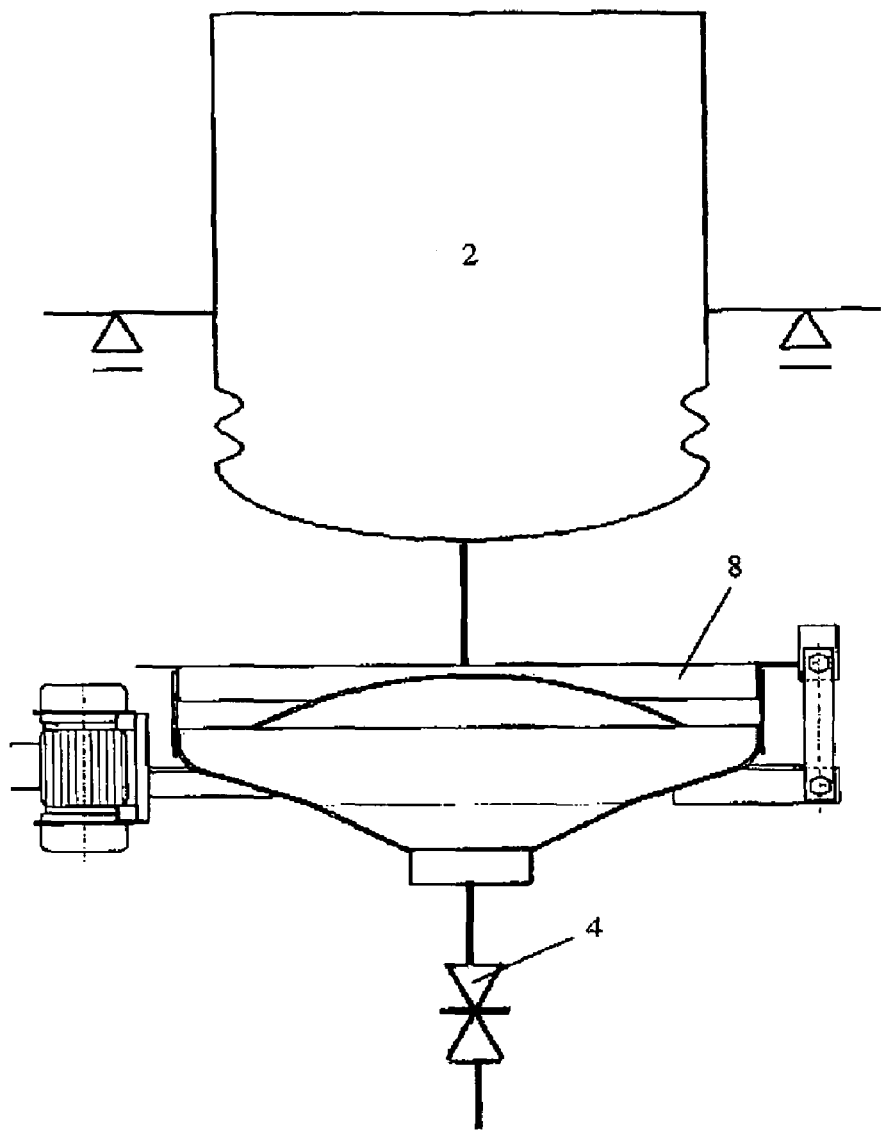
Figure 14 - PRIOR ART

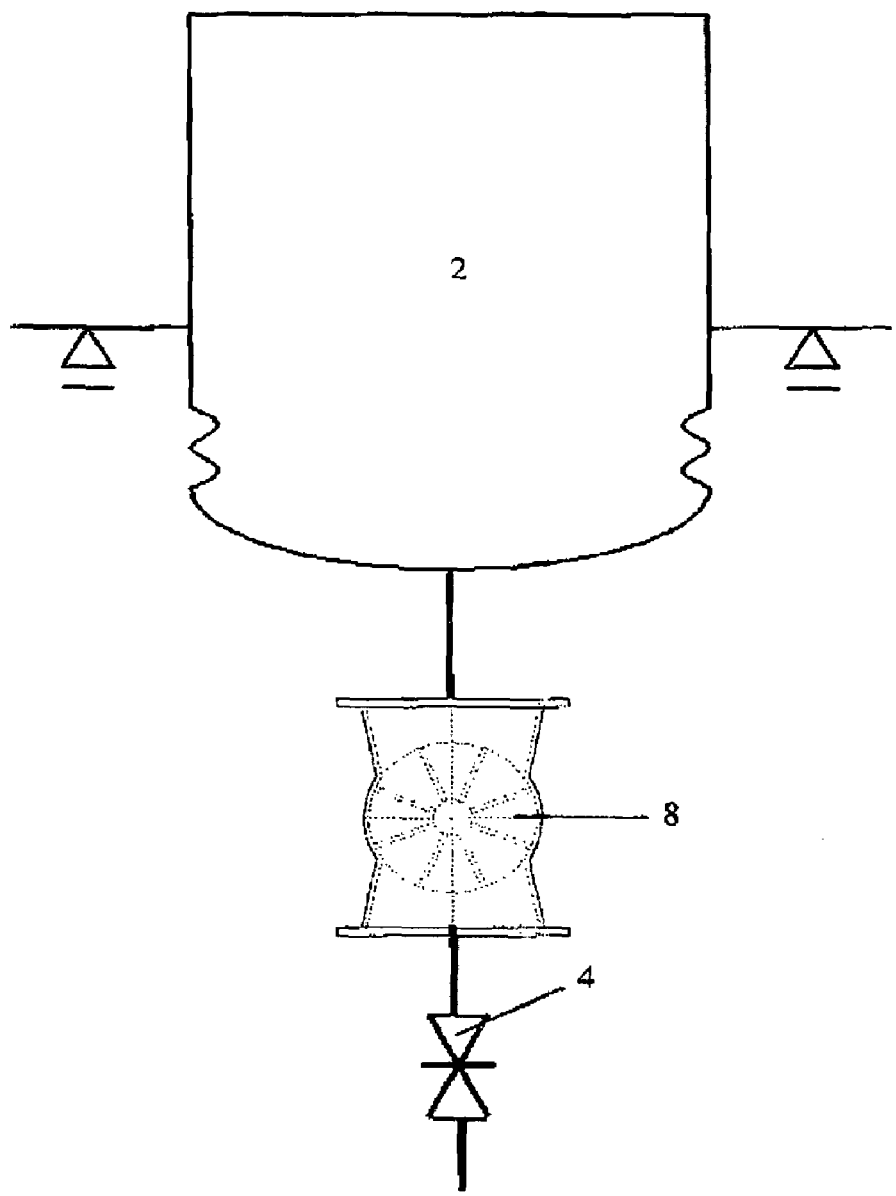
Figure 15 - PRIOR ART

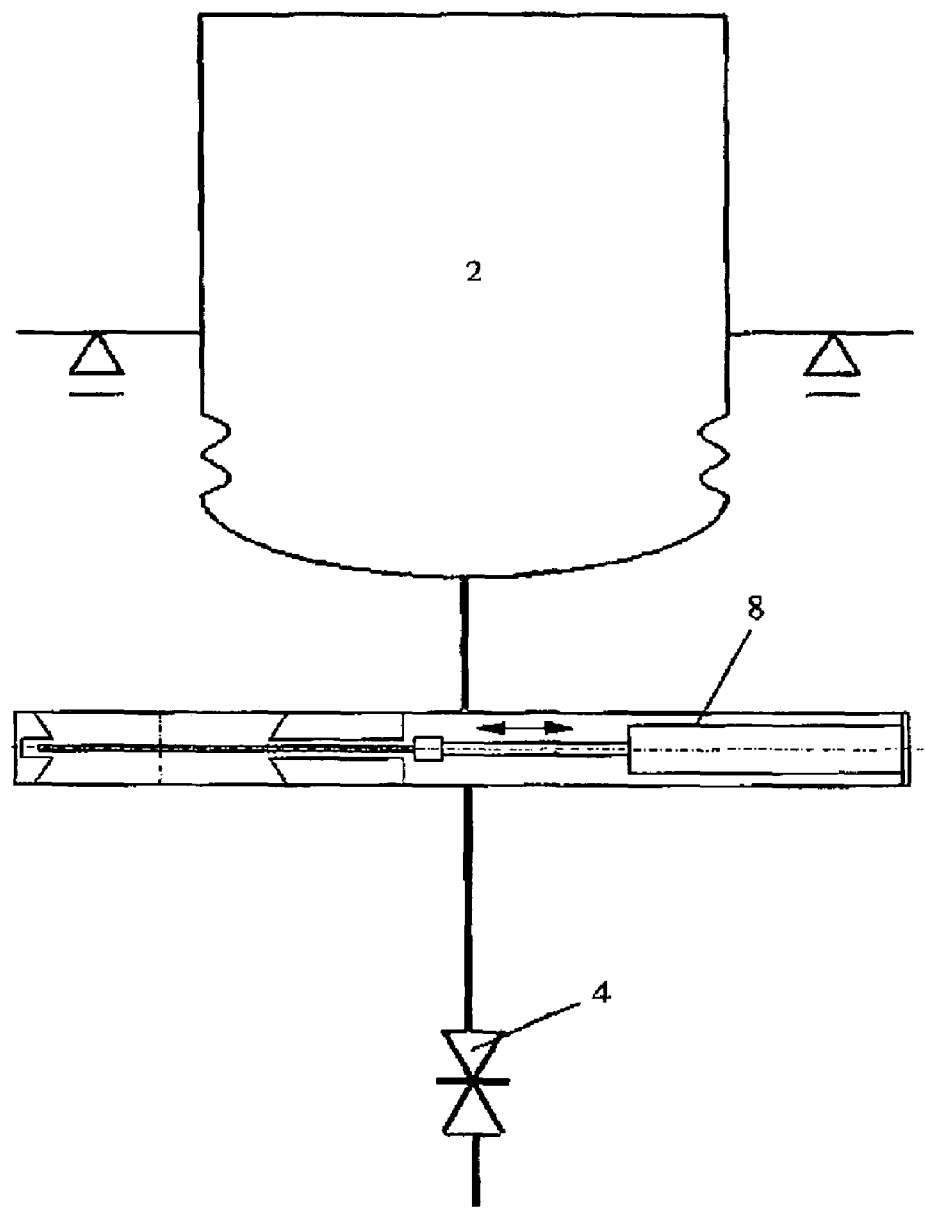
Figure 16 - PRIOR ART

METHOD AND APPARATUS FOR PNEUMATICALLY CONVEYING BULK MATERIAL WHICH DOES NOT FLOW READILY

BACKGROUND OF THE INVENTION

1. Field of the Invention

The invention relates to a method and an apparatus for pneumatically conveying bulk material which does not flow readily.

2. Brief Description of the Prior Art

A method of the type mentioned at the outset and an apparatus for carrying it out are known from EP 0 692 411 A1. This known technology uses a method of pneumatically conveying bulk material, in which the latter is transported in a pipe from a departure point by means of a gas stream to a reception point with the bulk material partly filling the pipe in a dense stream having a defined velocity by production of a plug in the pipe and, after closure of the inlet opening of the pipe by means of an inlet closure valve, the pipe being entirely or partly emptied by means of overpressure and with a pseudocontinuous mass flow from the departure point to the reception point being able to be established by continuous repetition of this cycle. The "pump flow method", in which the pipe is partly filled in suction dense stream operation by provision of a device to generate a partial vacuum and is emptied by switching over to pressure operation and star feeders or pressure vessels can thus be dispensed with, is disclosed in EP 0 692441 B1. Containers and Big Bags can be emptied pseudo-continuously in double action mode when two suction lines are installed in parallel.

A disadvantage here is that in the case of "dead" materials which do not flow readily, the vacuum is not sufficient to fill the suction lines. This causes problems with the closure devices and the transport process.

As an alternative, high-pressure star feeders and single/double pressure vessels have hitherto been used according to the prior art or combined with one another as described in DE 199 60 221 C2.

The screw pumps used for some decades are provided with a high power drive motor to convey the plug of bulk material before the closure flap between screw shaft and transport line, which is kept closed by the transport pressure. Screw pumps are mainly used for mineral materials.

DD 267850 A1 shows that transport screws without a closure flap can also be utilized for feeding bulk material if an input vessel is installed above the screw intake. The screw does not serve to overcome an input pressure difference, which would be associated with leakage of air, but has the task of regulating the loading $\mu$, i.e. the ratio of bulk material to transport air, or keeping it constant.

DE 40 14 912 A1 describes a technique in which the transport tube wall is to be kept free of deposits on the wall by means of a screw-shaped prefabricated partially flexible element having the appropriate direction of rotation so as to promote transport. Here too, the known, customary pressure vessel technology is proposed for the actual filling of the pipe.

It is therefore an object of the invention to provide a method and an apparatus for metering a predetermined amount of bulk material which does not flow readily, emptying it out completely and conveying it to a target point.

SUMMARY OF THE INVENTION

This object is achieved by a method of pneumatically conveying bulk material which does not flow readily, in which bulk material is metered by means of an input device (8) into a longitudinal conveyor (1) which is subsequently emptied via a transport line (19), characterized in that the metering of the bulk material into the longitudinal conveyor (1) is achieved by means of the input device (8) and the emptying of the longitudinal conveyor (1) is effected with simultaneous action of a mechanical conveyor (9) and inflowing compressed gas (17), with the mechanical conveyor (9) going around the wall in the longitudinal conveyor (1), so that the latter is emptied completely during the emptying process.

The distribution of the bulk material which does not flow readily in the longitudinal conveyor (1) is preferably uniform.

The compressed gas (17) is introduced at a pressure which allows pneumatic transport. This pressure is generally >1 bar, but can vary from system to system. The compressed gas (17) can preferably comprise compressed air, nitrogen, oxygen, other noble gases or mixtures thereof.

For the purposes of the present patent application, the term "bulk material which does not flow readily" describes bulk material which forms bridges or bulk material which does not run out without inducement or mechanical assistance. Examples of bulk material which does not flow readily are pigments and solids which have a parameter D(v, 0.9) of not more than 40 µm. The D(v, 0.9) parameter is known to those skilled in the art and indicates in the particle size distribution by volume the particle diameter at which 90% of the particles of a particle size distribution by volume have a particle diameter smaller than D(v, 0.9) and 10% of the particles have a particle diameter larger than D(v, 0.9).

For the purposes of the present patent application, "emptied completely" means that $\geq 97\%$ of the bulk material which does not flow readily metered into the longitudinal conveyor (1) is emptied out by means of the method. The longitudinal conveyor (1) is preferably emptied to an extent of $\geq 98\%$.

For the purposes of the present patent application, "going around the wall" means that the mechanical conveyor (9) is designed with a tight gap to the wall, in fact as tight as the manufacturing tolerances of screw and barrel allow.

The above teachings thus give the advantage that bulk material which does not flow readily can be introduced without problems and at a precisely metered rate into the pneumatic transport line (19) and conveyed to a destination.

The mechanical longitudinal conveyor (1) effects both the feeding of the bulk material which does not flow readily into the transport line (9) and also complete discharge after application of pressure. It is important that the mechanical conveyor (9) is configured so that it supports pneumatic transport, so that the bulk material which does not flow readily cannot settle on the bottom and the longitudinal conveyor (1) is emptied completely.

DETAILED DESCRIPTION OF THE INVENTION

In the method, preference is given to using an additional control device (36) to control the metering and the emptying of the longitudinal conveyor (1).

Here, the control device (36) controls and monitors the metering by means of the input device (8) into the longitudinal conveyor (1), the switching of the closure valves (4), (31), (32) and of the compressed gas valves (30) and also the switching on and off of the geared motor (7) for the screw.

The metering into and emptying of the longitudinal conveyor (1) is preferably repeated a number of times, with compressed gas (17) being passed via an additional bypass line (12) into the transport line (19) to maintain a flow velocity in the transport line (19) of from 15 to 50 m/s during the metering into the longitudinal conveyor (1).

The bulk material is preferably moved through the transport line (19) so that the metered amount of bulk material all reaches the reception point without settling.

For the purposes of the present patent application, "settling" means that bulk material deposits on the bottom of the longitudinal conveyor (1) or on the bottom of the transport line (19) and is no longer conveyed by the gas stream which is fed in by means of the compressed gas (17).

The invention also relates to an apparatus for pneumatically conveying bulk material which does not flow readily, which comprises an input device (8), a longitudinal conveyor (1) having a mechanical conveyor (9), a geared motor (7) for the mechanical conveyor (9), compressed gas inlet (11) and outlet lines (10), each in the end region of the longitudinal conveyor (1), and a transport line (19) for the bulk material or compressed gas (17), characterized in that the mechanical conveyor (9) is installed in the longitudinal conveyor (1) in such a way that it goes around the wall.

Preference is given to an apparatus which has one or more passages (13) for compressed gas (17).

As mechanical conveyor (9), preference is given to a ribbon screw, paddle screw, full blade screw or double screw, in particular a double paddle screw or double ribbon screw.

When using one of the abovementioned screws, a corkscrew-like flow is preferably generated and this in combination with the mechanical transport action of the screw effects complete emptying of the longitudinal conveyor (1). The addition of compressed gas (17) is effected via the compressed gas inlet line (11) and, if appropriate, at the passages (13) over the entire length of the longitudinal conveyor (1) and at the compressed gas outlet line (10) by means of the feed devices available according to the prior art. In a corresponding apparatus having a ribbon screw, it has been found that bulk material which has high internal friction and does not flow readily can be introduced in precisely metered amounts into the transport line (19) and discharged with the aid of the mechanical transport action.

The passage (13) for the compressed gas (17) is preferably located on the underside of the longitudinal conveyor (1). Here, "underside" means on the lower semicircle of the longitudinal conveyor (1).

A bypass line (12) having an annular gap or a T-piece downstream of the compressed gas outlet line (10) is preferably installed on the transport line (19).

A pinch valve or a ball valve is preferably installed downstream of the compressed gas outlet line (10) in the direction of the transport line (19).

Preference is given to using a vibratory chute, a transport screw, a position-controlled slider or a star feeder as input device (8).

A peristaltic squeezing device (18) is preferably located above the input device (8). This aids discharge from supply containers (2) such as Big Bags. For discharge from supply containers (2) such as hoppers and containers, preference is given to using a fluidization facility having air nozzles or a vibratory chute. As a result of the fluidizing action and the simultaneous transport brought about by the screw, it is possible to introduce the bulk material completely and in a troublefree manner without formation of blockages into the remaining subunit of the transport line (19).

Metering into the longitudinal conveyor (1) is preferably recorded by means of one or more weighing devices (38). Here, a control device (36) makes it possible to ensure that precisely the desired and required amount of bulk material is introduced into the longitudinal conveyor (1). As an alternative, the determination of the weight can also be carried out by means of difference measurement on a preceding supply container (2).

A particular variant of the apparatus of the invention provides for a plurality of supply containers (2) opening into the longitudinal conveyor (1) at a mutual spacing. Such an embodiment is particularly advantageous when a plurality of components are to be metered according to a formulation, a mixture or a batch and conveyed pneumatically over a relatively long distance. For this purpose, a plurality of input devices (8) integrated into the control device (36) can be located on the underside of the supply containers (2) at a mutual spacing in order to control the metering of the bulk material which does not flow readily.

Preference is given to constructing a plurality of the apparatuses described and connecting them in parallel. Preference is given to one or more apparatuses being supplied by means of one or more input devices (8).

An advantage of the method of the invention and the associated apparatus is that any portions of bulk material can be formed by means of the novel longitudinal conveyor (1) according to the invention. Owing to the necessary mounting of a transport screw as mechanical conveyor (9), it is accordingly provided in the case of relatively long plugs of bulk material for screw conveyors (1) of this type having intermediate mountings to be used or for a plurality of longitudinal conveyors (1) to be arranged one after the other so as to convey a relatively large amount of bulk material.

The invention thus makes it possible for lengths of longitudinal conveyors (1) in the range from 5 to 20 metres and more to be produced without problems so that these amounts of bulk material can be pneumatically conveyed in a controlled fashion to a target vessel (20).

The invention is therefore not only performed by arrangement of a longitudinal conveyor (1) in a part of the transport line (19) but also by means of a compressed gas inlet line (11) and, if appropriate, passages (13) for the compressed gas (17) which are located on the circumference of the barrel of the longitudinal conveyor (1) and aerate the bulk material which does not flow readily in the longitudinal conveyor (1) in order to make it possible for the bulk material which does not flow readily to be conveyed.

The use of two longitudinal conveyors (1) connected in parallel results in pseudocontinuous pneumatic transport which can otherwise only be achieved using high-pressure star feeders or double pressure vessels but avoids air leakage and construction height problems. The outlay in terms of mechanical equipment when using a screw and drive motor as mechanical conveyor (9) is far less than in the case of the previously known methods. Aeration of the longitudinal conveyor (1) during metering is not necessary and metering occurs purely mechanically, while the emptying of the longitudinal conveyor (1) is pneumatically/mechanically assisted.

Placing the apparatus of the invention in a channel having a depth of less than 50 cm or at ground floor level in a battery of hoppers saves an entire storey, whether an above-ground floor or a cellar. In particular, the frequent practical problems associated with the water table in facilities for the unloading of bulk materials do not occur. Connection to heavy railway wagons for bulk goods under the tracks with sensible unloading throughputs can now be realized better than before.

The invention is illustrated below with the aid of drawings depicting a plurality of ways in which the invention may be performed. Here, the drawings and their description disclose further inventive features and advantages of the invention.

Figure 5:
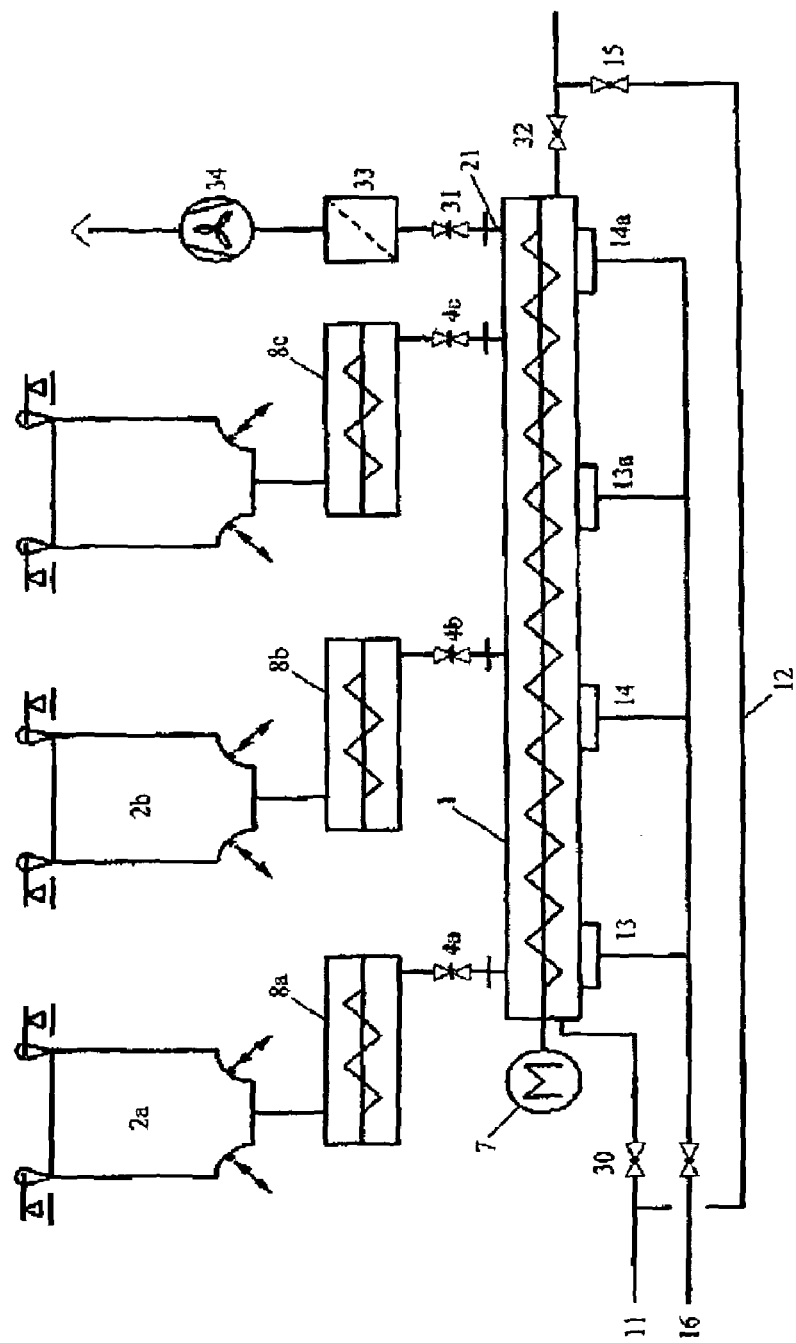

In the figures: FIG. 5: shows a multiplication of the arrangement of FIG. 1: transport of bulk material mixtures and batches from a plurality of different supply containers (2); FIG. 6 shows a supply container (2) with a peristaltic pushing device (18); FIG. 7 shows a supply container (2) with a fluidization facility having air nozzles (41) installed above the input device(s) (8); FIG. 8 shows a side and cross-section view of a ribbon screw as an input device (8); FIG. 9 shows a side and cross-section view of a full blade screw as an input device (8); FIG. 10 shows a side and cross-section view of a paddle screw as an input device (8); FIG. 11 shows a side and cross-section view of a double screw as an input device (8); FIG. 12 shows a side and cross-section view of a double ribbon screw as an input device (8); FIG. 13 shows a side and cross-section view of a double paddle screw as an input device (8); FIG. 14 shows a vibrating pan conveyor used as an input device (8); FIG. 15 shows a rotary air lock used as an input device (8); and FIG. 16 shows a position-controlled slide gate used as an input device (8).

FIG. 1 shows, in general outline, an apparatus according to the invention in which the bulk material which does not flow readily which is to be transported is stored in a Big Bag as supply container (2). A predefined amount is to be conveyed by means of the pneumatic transport device into a target vessel (20) provided with an intake filter (35) and extraction fan (40). The Big Bag as supply container (2) can be emptied automatically by means of known commercially available squeezing devices. The bulk material which does not flow readily is accordingly introduced through the open shutoff flap (4) and an associated connection piece (5) in the direction of the arrow (6) into the longitudinal conveyor (1) which distributes the bulk material which does not flow readily over the length of the transport barrel of the longitudinal conveyor (1). The compressed gas (17) displaced by the bulk material which does not flow readily is passed through an exhaust filter (33). The filling of the longitudinal conveyor (1) can in the simplest way be controlled over a time (volumetric metering). For precise metering purposes, the metering into the longitudinal conveyor (1) is controlled by weight. A number of variants are possible for this purpose.

The weight of the Big Bag as supply container (2) is measured when it is hung up. After a particular amount of bulk material has been let out, introduction into the longitudinal conveyor (1) is stopped. In another version, the weight of the longitudinal conveyor (1) is determined, and the longitudinal conveyor (1) is equipped with compensators for this purpose. The metering into the longitudinal conveyor (1) is stopped as a function of the increase in the weight of the longitudinal conveyor (1).

Figure 2:
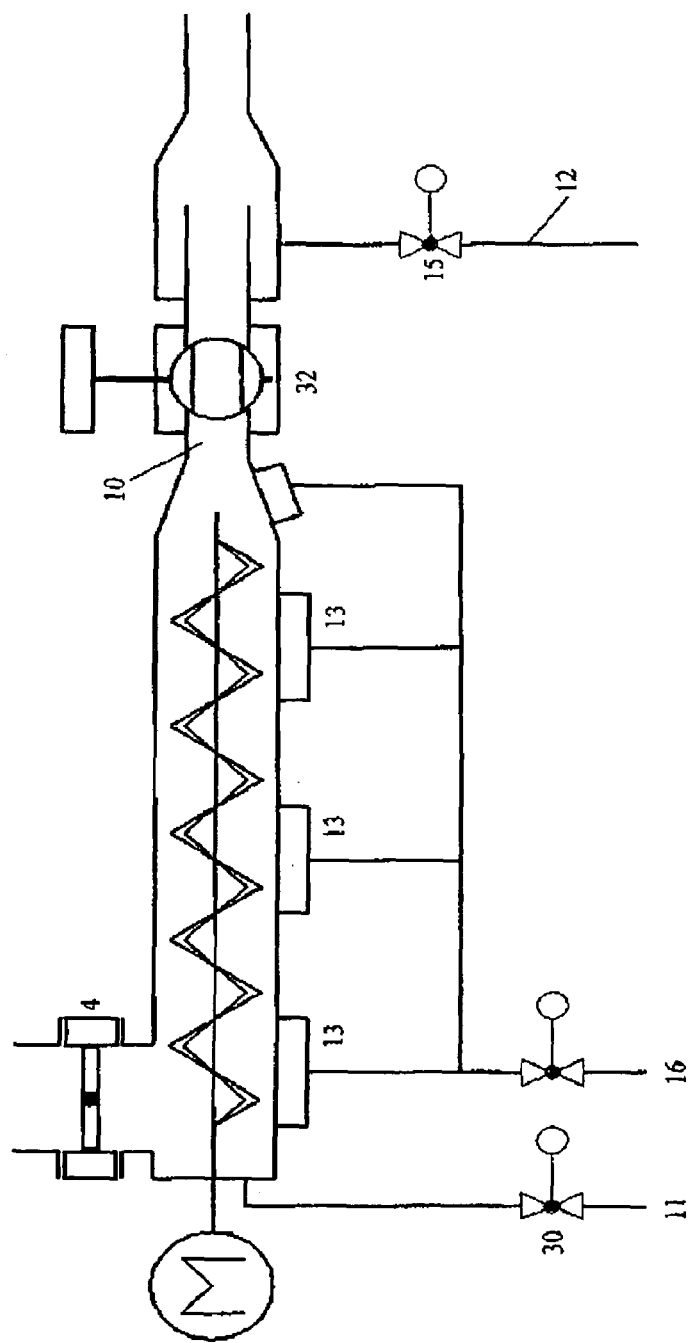
Figure 3:
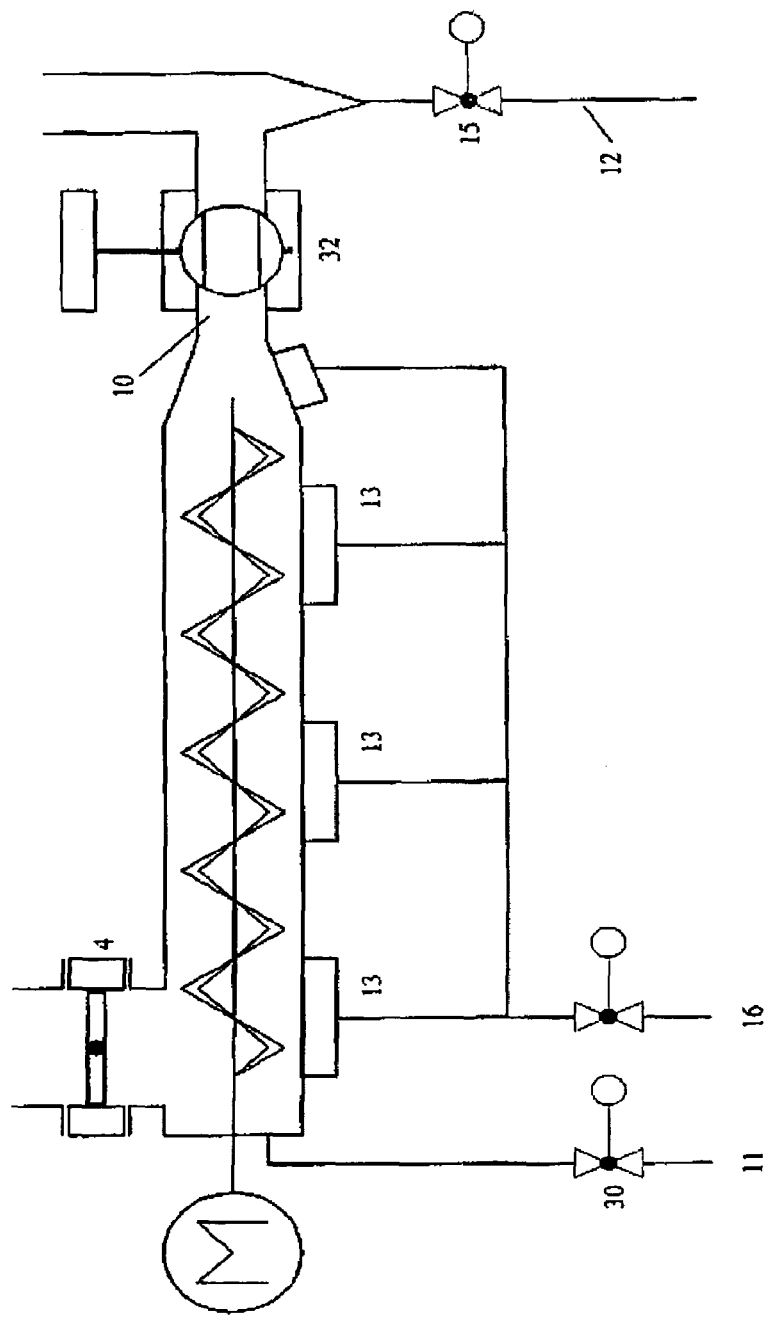

In a further variant, the Big Bag as supply container (2) can be emptied periodically in steps into a metering apparatus as input device (8). The required amount of bulk material is introduced into the longitudinal conveyor (1) by means of the metering apparatus as input device (8). After metering into the longitudinal conveyor (1), the shutoff flap (4) and the exhaust flap (31) are closed. Compressed gas (17) is fed via the compressed inlet line (11) into the closed longitudinal conveyor (1). As soon as the pressure in the longitudinal conveyor (1) is above the pressure in the transport line (19), the outlet closure valve (32) to the transport line (19) is opened. At the same time as the opening of the outlet closure valve (32), the longitudinal conveyor (1) is turned on again and the amounts of compressed gas are increased to a predetermined value. The fluidization facility as passage (13) results in a reduction in the internal friction of the bulk material which does not flow readily and a discharge. The bulk material which does not flow readily is discharged by means of the compressed gas (17) introduced via the compressed gas inlet line (11) of the longitudinal conveyor (1) with the aid of the longitudinal conveyor (1) and under the action, i.e. rotation, of the mechanical conveyor (9). The longitudinal conveyor (1) effects complete emptying out of the bulk material which does not flow readily. After emptying, the outlet closure valve (32) and the compressed gas valves (30) of the compressed gas inlet line (11) are closed again. In order to convey the amount of bulk material which does not flow readily which has been introduced into the transport line (19) to the target, compressed gas (17) then has to be introduced as transport means via a bypass line (12). The longitudinal conveyor (1) is depressurized via the exhaust line and via the exhaust port (21) and via the exhaust filter (33). This is aided by the exhaust fan (34). A fresh transport cycle according to the above description can then be commenced. With regard to the introduction of the compressed gas (17) for pneumatic transport, there is not only the abovementioned possibility of feeding it in on the input side but also the possibility of feeding it in via an annular gap as shown in FIG. 2 or a T-piece as shown in FIG. 3 on the outlet side.

Figure 4:
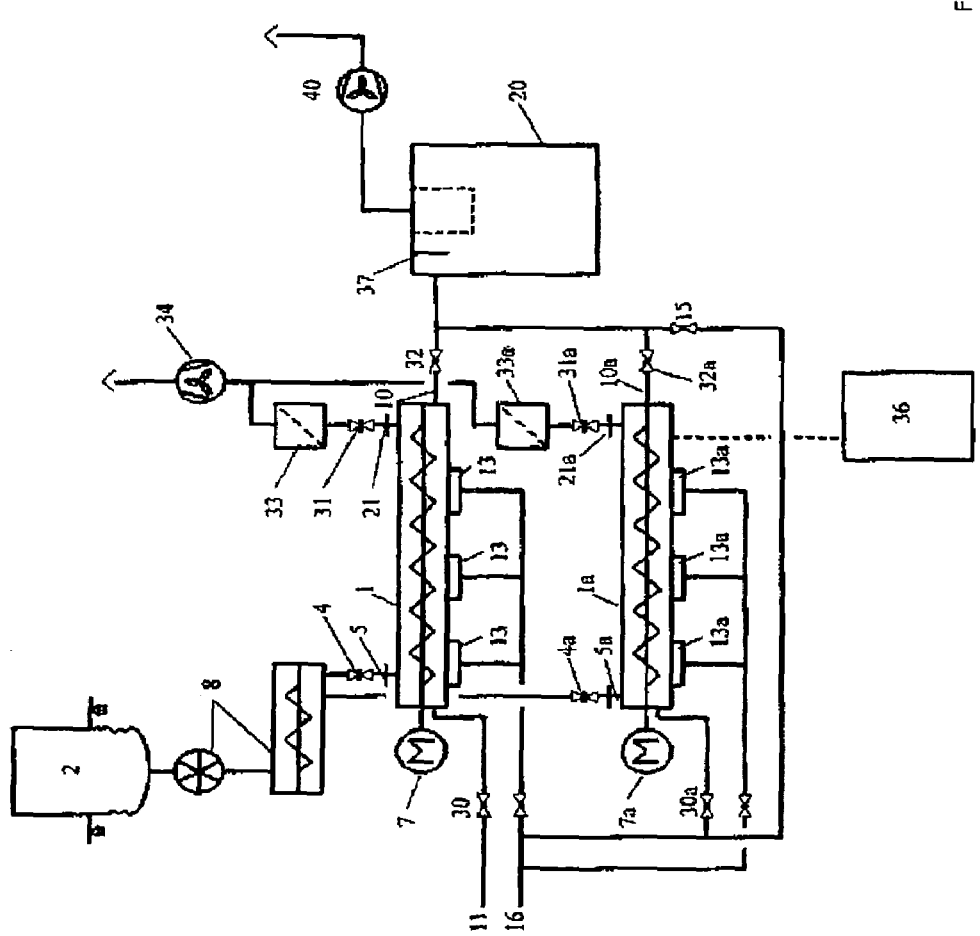

In the example shown in FIG. 4, pseudocontinuous transport with two longitudinal conveyors (1) and (1a) which are operated alternately is provided. All parts of the one apparatus are denoted by simple reference numerals, while the same parts of the other branch are denoted by a letter (for example a, b, c or d).

FIG. 4 shows that the one longitudinal conveyor (1) is being charged for pneumatic transport, while the other longitudinal conveyor (la) is discharging the bulk material which does not flow readily which has been introduced, and vice versa. In this example, pneumatic transport from a hopper as supply container (2) and star feeder as input device (8) has been selected.

The duplicated parts are therefore in operation only alternately. This achieves a pseudocontinuous mass flow in the transport line (19) because the two subsections of the transport lines (19a) open into one another and thus alternately fill the transport line (19).

The above-described double plant with alternate operation is preferably operated via a control system (36).

Instead of metering into the longitudinal conveyor (1) from a Big Bag as supply container (2), the longitudinal conveyor (1) can also be charged from:
a hopper
a container
a railway tank wagon
or a bulk tanker.

Here, the methods described for input and control of the amount to be metered into the longitudinal conveyor (1) are available in an analogous way.

FIG. 5 shows an industrial plant for metering components by means of the pneumatic pressure transport apparatus of the invention. This example makes important advantages of the invention clear. It is shown that only one apparatus which is supplied from a plurality of supply containers 2a-c) and input devices (8a-c) is necessary for conveying a number of bulk materials which do not flow readily.

Here too, the longitudinal conveyor (1) can comprise a plurality of individual longitudinal conveyors (1) which are arranged in series and connected to one another in the transport direction, so that a plurality of passages (13) for compressed gas (17) are also located on the underside of the resulting, relatively long tubular vessel of the longitudinal conveyor (1).

For metering and transport to a particular plant which carries out further processing, the mechanical conveyor (9) can be filled simultaneously from a number of supply containers (2) (for example Big Bags) under programme control.

For this purpose, the shutoff flaps (4a-c) are opened and the input devices (8a-c), in FIG. 5 metering screws as input device (8), are switched on. After the intended amount of bulk material which does not flow readily has been introduced into the longitudinal conveyor (1), which is determined by means of the measurement of the weight of the supply container (2), the shutoff flaps (4a-c) and the exhaust flap (31) are closed. The amount of bulk material which does not flow readily intended for a mixture or a batch can subsequently be conveyed in the manner described above to a plant which carries out further processing.

A particular advantage of the method described is that the mixture or the batch can be initially charged in the longitudinal conveyor (1), so that the time elapsed for transport of the mixture of bulk material which does not flow readily or a batch produced therefrom is very short.

This procedure and the apparatuses according to the invention increase the productivity of the downstream plants.

As a function of the mixing components, it is advantageous to operate the apparatuses according to the invention by means of a control device (36) in which the matched parameters of the rotational speed of the screw of the mechanical conveyor (9) and the amount of compressed gas (17) have been put in the memory.

The rotational speed of the screw of the mechanical conveyor (9) and the amount of compressed gas (17) can, in an advantageous embodiment, be regulated as a function of the pressure in the longitudinal conveyor (1) in order to prevent blockages in the pipe.

The subject matter of the present invention consists not only of the subject matter of the individual claims but also encompasses combinations of the individual claims with one another. The same applies to all parameters disclosed in the description and any combinations thereof.

The invention is illustrated by the following example, without this restricting the invention.

REFERENCE NUMERALS

1. Longitudinal conveyor
2. Supply container
4. Shutoff flap
5. Connection port
6. Arrow direction
7. Geared motor
8. Input device
9. Mechanical conveyor
10. Compressed gas outlet line
11. Compressed gas inlet line
12. Bypass line
13. Passages
15. Bypass valve
17. Compressed gas
18. Peristaltic squeezing device
19. Transport line
20. Target vessel
21. Exhaust port
30. Compressed gas valve
31. Exhaust flap
32. Outlet closure valve
33. Exhaust filter
34. Exhaust fan
35. Intake filter
36. Control device
38. Weighing device
40. Extraction fan

EXAMPLE

An apparatus configured in accordance with the present patent application comprised a screw barrel as longitudinal conveyor (1) which had a diameter of 200 mm and was provided with a ribbon screw having a length of 2.5 m as mechanical conveyor (9) which was installed so that it went around the wall in the longitudinal conveyor (1).

The bulk material which did not flow readily which was to be coneyed was an iron oxide having a D(v, 0.9) parameter of 4.56 µm and a density of 0.45 t/m$^3$. The D(v, 0.9) parameter was determined by means of laser light scattering ("Mastersizer-S" instrument from Malvern Instruments) in an aqueous suspension containing 0.1% of sodium phosphate as dispersant after ultrasonic dispersion at 200 W for two minutes.

The bulk material which did not flow readily which was to be conveyed travelled into the longitudinal conveyor (1) comprising a ribbon screw from a supply container (2) via a shutoff flap (4) as input device (8). The longitudinal conveyor (1) was followed by a transport line (19) having a nominal width of 65 mm and a length of 45 m. At the discharge end of the longitudinal conveyor (1), the air displaced by the bulk material could be taken off as compressed gas (17) via an exhaust filter (33).

During metering into the longitudinal conveyor (1), the ribbon screw as mechanical conveyor (9) operated at 60 rpm for 12 s, driven by a geared motor (7) from Fabrikat Bauer. 30 kg of iron oxide were metered into the longitudinal conveyor (1) in this way. The shutoff flap (4) and the exhaust flap (31) were then closed. The compressed gas (17) used was compressed air which was subsequently introduced at a flow rate of 260 standard m$^3$/h via the compressed gas inlet line (11), which was located in the end region of the longitudinal conveyor (1), and the passages (13).

The longitudinal conveyor (1) was subsequently emptied in 20 s through the compressed gas outlet line (10), which was located at the other end region of the longitudinal conveyor (1), while the compressed air was simultaneously passed through it and with the ribbon screw operating as mechanical conveyor (9), with all of the product being transported via the transport line (19) into the target vessel (20) provided with intake filter (35) and extraction fan (40). Of the 30 kg of iron oxide metered in, 29.43 kg were conveyed, so that the longitudinal conveyor (1) was emptied to an extent of ≧98%. The pressure in the screw was 2.3 bar here.

After depressurization, stopping of the ribbon screw and closure of the compressed gas valves (30), the transport cycle could be repeated a number of times in the same way.

The invention claimed is:

1. Apparatus for pneumatically conveying bulk material which does not flow readily, which comprises one or more input device(s) (8) having a means for variable metering, a lateral conveyor (1) having a material inlet and outlet and having a mechanical conveyor (9) having a discharge end, said end extending to said outlet, a geared motor (7) for the mechanical conveyor (9), a compressed gas inlet line (11) and a compressed gas outlet line (10), at opposite ends of the lateral conveyor, respectively, (1), and a transport line (19) for the bulk material or compressed gas (17) downstream from the compressed gas outlet line (10), whereby the mechanical conveyor (9) is installed in the lateral conveyor (1) in such a way that it has a narrow clearance with respect to the lateral conveyor.

2. Apparatus according to claim 1, wherein the apparatus has one or more passages (13) for compressed gas (17).

3. Apparatus according to claim 1, wherein the mechanical conveyor (9) is a ribbon screw, paddle screw, full blade screw, double screw, a double paddle screw or a double ribbon screw.

4. Apparatus according to claim 1, wherein a passage (13) for the compressed gas (17) is located on the underside of the lateral conveyor (1).

5. Apparatus according to claim 1, wherein a bypass line (12) having an annular gap or a T-piece downstream of the compressed gas outlet line (10) is installed on the transport line (19).

6. Apparatus according to claim 1, wherein a pneumatic pinch valve or a ball valve is installed downstream of the compressed gas outlet line (10) in the direction of the transport line (19).

7. Apparatus according to claim 1, wherein a vibrating pan conveyor, a conveying screw, a position-controlled slide gate or a rotary air lock is used as an input device (8).

8. Apparatus according to claim 1, wherein a peristaltic pushing device is located above the input device(s) (8).

9. Apparatus according to claim 1, wherein a supply container (2) provided with a fluidization facility having air nozzles is installed above the input device(s) (8).

10. Apparatus according to claim 1, wherein the supply container (2) contains one or more weighing devices (38).

11. System for pneumatically conveying bulk material which does not flow readily, which comprises a plurality of apparatuses connected in parallel wherein each apparatus comprises one or more input device(s) (8) having a means for variable metering, a lateral conveyor (1) having a material inlet and outlet and having a mechanical conveyor (9) said end extending to said outlet, a geared motor (7) for the mechanical conveyor (9), a compressed gas inlet line (11) and a compressed gas outlet line (10), at opposite ends of the lateral conveyor, respectively, (1), and a transport line (19) for the bulk material or compressed gas (17) downstream from the compressed gas outlet line (10), whereby the mechanical conveyor (9) is installed in the lateral conveyor (1) in such a way that it has a narrow clearance with respect to the lateral conveyor.

* * * * *